US012654871B2

(12) United States Patent
Sobanski et al.

(10) Patent No.: US 12,654,871 B2
(45) Date of Patent: Jun. 16, 2026

(54) FRAMED HEAT EXCHANGER FOR AIRCRAFT PROPULSION SYSTEM

(71) Applicant: RTX Corporation, Farmington, CT (US)

(72) Inventors: Jon Erik Sobanski, Glastonbury, CT (US); Jeffrey T. Morton, Manchester, CT (US)

(73) Assignee: RTX Corporation, Farmington, CT (US)

( * ) Notice: Subject to any disclaimer, the term of this patent is extended or adjusted under 35 U.S.C. 154(b) by 186 days.

(21) Appl. No.: 18/418,908

(22) Filed: Jan. 22, 2024

(65) Prior Publication Data

US 2025/0236408 A1 Jul. 24, 2025

(51) Int. Cl.
B64D 33/10 (2006.01)
B64D 27/40 (2024.01)

(52) U.S. Cl.
CPC ............. B64D 33/10 (2013.01); B64D 27/40 (2024.01)

(58) Field of Classification Search
CPC B64D 27/40–406; B64D 29/00; B64D 33/08; B64D 33/10; F02K 3/105; F02K 3/11; F02K 3/115
See application file for complete search history.

(56) References Cited

U.S. PATENT DOCUMENTS

| | | | |
|---|---|---|---|
| 5,004,044 A | | 4/1991 | Horgan |
| 6,931,834 B2 * | | 8/2005 | Jones ................. H05K 7/20318 |
| | | | 60/730 |
| 7,213,391 B2 * | | 5/2007 | Jones ........................ F02C 7/00 |
| | | | 60/730 |
| 8,235,657 B2 | | 8/2012 | Bulin |
| 8,673,230 B2 | | 3/2014 | Rizzi |
| 9,243,563 B2 | | 1/2016 | Lo |
| 10,240,531 B2 | | 3/2019 | Schwarz |
| 10,443,436 B2 | | 10/2019 | Miller |
| 11,519,295 B2 * | | 12/2022 | Roberge ................. F01D 25/12 |
| 11,549,393 B2 | | 1/2023 | Cleyet |
| 11,958,623 B2 * | | 4/2024 | Roberge ................... F28D 1/06 |
| 12,000,334 B1 * | | 6/2024 | Sobanski ................. F02K 3/06 |
| 12,215,620 B2 * | | 2/2025 | Sobanski ................. F02C 6/18 |
| 2018/0003076 A1 | | 1/2018 | Miller |
| 2020/0300164 A1 * | | 9/2020 | Muldoon ............... F02C 7/185 |
| 2022/0403780 A1 | | 12/2022 | Price |
| 2025/0236408 A1 * | | 7/2025 | Sobanski ................. F02K 3/06 |

FOREIGN PATENT DOCUMENTS

FR 3126445 A1 3/2023

OTHER PUBLICATIONS

EP Search Report for EP Patent Application No. 25153409.5 dated May 22, 2025.

* cited by examiner

*Primary Examiner* — Christopher R Legendre
(74) *Attorney, Agent, or Firm* — Getz Balich LLC

(57) ABSTRACT

An assembly for an aircraft includes an airframe structure, a turbine engine and a heat exchanger. The turbine engine is mounted to the airframe structure. The heat exchanger is mounted to the airframe structure independent of the turbine engine. The heat exchanger extends axially along and circumferentially about the turbine engine.

18 Claims, 7 Drawing Sheets

FRAMED HEAT EXCHANGER FOR AIRCRAFT PROPULSION SYSTEM

BACKGROUND OF THE DISCLOSURE

1. Technical Field

This disclosure relates generally to an aircraft and, more particularly, to a heat exchanger for an aircraft propulsion system.

2. Background Information

An aircraft propulsion system may include one or more heat exchangers. Various types of heat exchangers and techniques for mounting heat exchangers are known in the art. While these known heat exchangers and mounting techniques have various benefits, there is still room in the art for improvement.

SUMMARY OF THE DISCLOSURE

According to an aspect of the present disclosure, an assembly is provided for an aircraft. This aircraft assembly includes an airframe structure, a turbine engine and a heat exchanger. The turbine engine is mounted to the airframe structure. The heat exchanger is mounted to the airframe structure independent of the turbine engine. The heat exchanger extends axially along and circumferentially about the turbine engine.

According to another aspect of the present disclosure, another assembly is provided for an aircraft. This aircraft assembly includes a turbine engine, a nacelle and a heat exchanger. The nacelle houses the turbine engine. The heat exchanger is disposed within the nacelle. The heat exchanger includes a frame and a plurality of heat exchanger cores arranged circumferentially about and axially overlapping the turbine engine. Each of the heat exchanger cores is attached to and supported by the frame.

According to still another aspect of the present disclosure, another assembly is provided for an aircraft. This aircraft assembly includes a frame and a plurality of heat exchanger cores. The frame includes a first support ring, a second support ring, a backbone and an aperture. The first support ring and the second support ring each extend circumferentially around an axis. The backbone extends axially between and is connected to the first support ring and the second ring. The aperture extends radially through the frame. The aperture extends axially within the frame between the first support ring and the second support ring. The aperture extends circumferentially about the axis within the frame between opposing sides of the backbone. The heat exchanger cores are arranged circumferentially about the axis in an array. The array of the heat exchanger cores are arranged in the aperture axially between the first support ring and the second support ring. Each of the heat exchanger cores is mounted to the first support ring and the second support ring.

The assembly may also include an airframe structure. The backbone may be pivotally mounted to the airframe structure by a pivot connection.

The assembly may also include a turbofan engine. The frame and the array of the heat exchanger cores may axially overlap and extend circumferentially about the turbofan engine.

The airframe structure may be configured as or otherwise include a pylon. The turbine engine may be mounted to the pylon. The heat exchanger may be mounted to the pylon independent of the turbine engine.

The assembly may also include a mounting structure structurally tying the turbine engine to the airframe structure. The mounting structure may extend radially across and may be structurally decoupled from the heat exchanger.

The turbine engine may be fixedly mounted to the airframe structure. The heat exchanger may be movably mounted to the airframe structure.

The heat exchanger may be pivotally mounted to the airframe structure by a pivot connection.

The assembly may also include a bypass flowpath arranged downstream of a fan section of the turbine engine. The bypass flowpath may be disposed radially outboard of a core of the turbine engine. The heat exchanger may be disposed radially outboard of and may axially overlap the bypass flowpath.

The assembly may also include a nacelle housing the turbine engine. The heat exchanger may be disposed in a cavity radially between a case of the turbine engine and a wall of the nacelle.

The heat exchanger may include a frame and a plurality of heat exchanger cores. The frame may be mounted to the airframe structure. The heat exchanger cores may be arranged circumferentially about an axis. Each of the heat exchanger cores may be attached to and supported by the frame.

The heat exchanger cores may include a first heat exchanger core. A first passage may extend radially across the first heat exchanger core. A second passage may extend laterally across the first heat exchanger core.

The turbine engine may be configured to direct air into the first passage and combustion products into the second passage.

The frame may include a first support ring, a second support ring and a backbone. The first support ring and the second support ring may each extend circumferentially around the turbine engine. The backbone may extend axially between and may be connected to the first support ring and the second ring. The heat exchanger cores may be arranged axially between and may be mounted to the first support ring and the second support ring.

The first support ring and the second support ring may be connected to the airframe structure through the backbone.

An aperture may extend radially through the frame. The aperture may extend axially within the frame between the first support ring and the second support ring. The aperture may extend circumferentially about an axis within the frame between opposing sides of the backbone. The heat exchanger cores may be arranged in the aperture.

The heat exchanger cores may include a first heat exchanger core. The first heat exchanger core may extend axially between a first end and a second end. The first heat exchanger core may be mechanically fastened to the first support ring at the first end. The first heat exchanger core may be mechanically fastened to the second support ring at the second end.

The turbine engine may be a turbofan engine with a fan case. The first support ring may be radially outboard of and may axially overlap the fan case. The second support ring may be spaced axially from the fan case.

The heat exchanger may be configured as or otherwise include a gas-to-gas heat exchanger.

The heat exchanger may be configured as or otherwise include a cross-flow heat exchanger.

The heat exchanger may be configured as or otherwise include a condenser.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
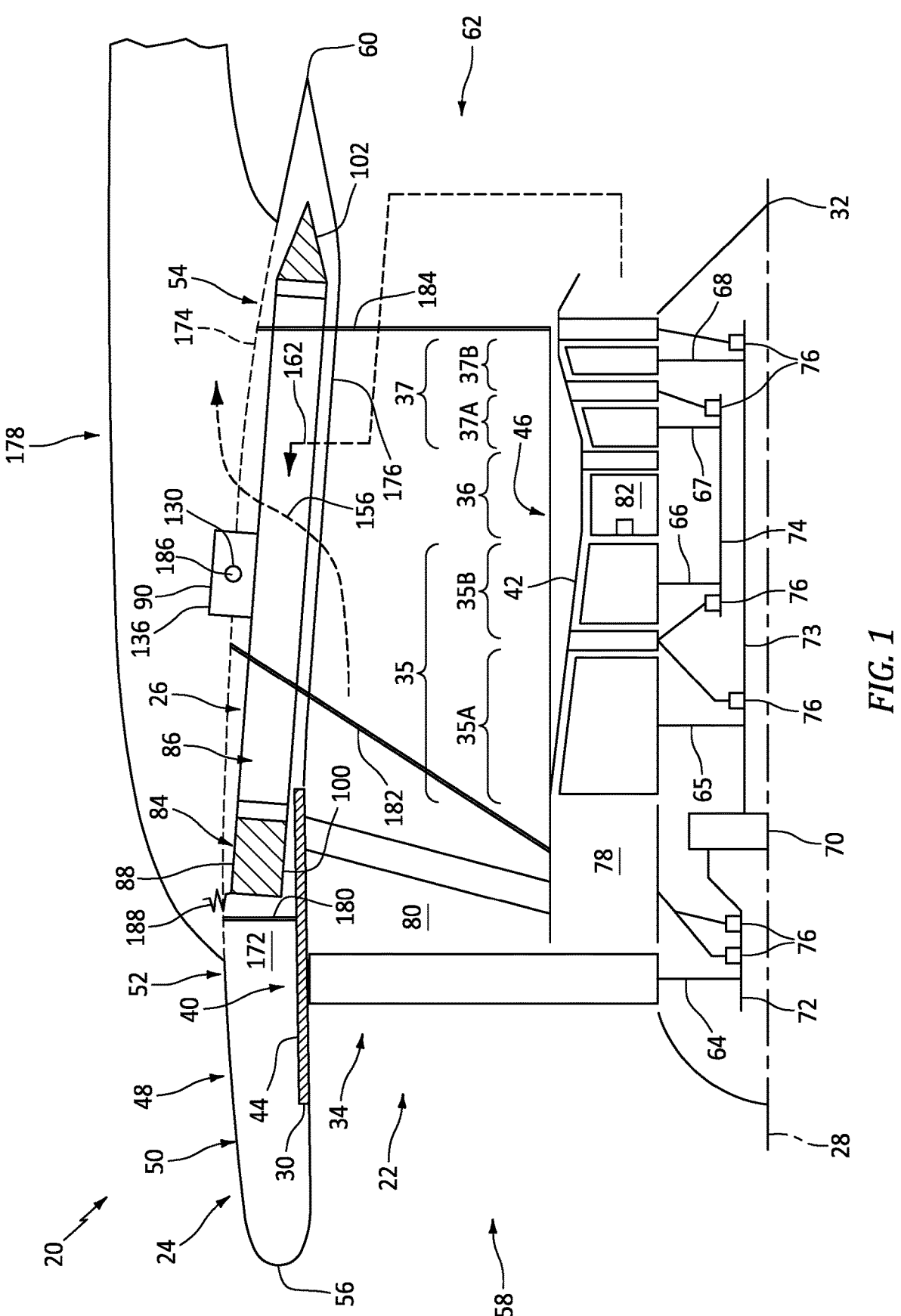
FIG. 1 is a partial sectional illustration of an aircraft propulsion system mounted to an airframe structure.

FIG. 1 illustrates a propulsion system 20 for an aircraft. The aircraft may be an airplane, a drone (e.g., an unmanned aerial vehicle (UAV)) or any other manned or unmanned aerial vehicle or system. The aircraft propulsion system 20 includes a turbine engine 22 and a nacelle 24 housing and forming an aerodynamic cover over the turbine engine 22. The aircraft propulsion system 20 also includes a heat exchanger 26.

The turbine engine 22 extends axially along an axis 28 between an upstream, forward end 30 of the turbine engine 22 and a downstream, aft end 32 of the turbine engine 22. This axis 28 may be a centerline axis of the aircraft propulsion system 20 and/or one or more of its members 22, 24 and/or 26. The axis 28 may also or alternatively be a rotational axis of one or more rotating assemblies of the turbine engine 22.

The turbine engine 22 may be configured as a geared turbofan engine. The turbine engine 22 of FIG. 1, for example, includes a fan section 34, a compressor section 35, a combustor section 36 and a turbine section 37. The compressor section 35 may include a low pressure compressor (LPC) section 35A and a high pressure compressor (HPC) section 35B. The turbine section 37 may include a high pressure turbine (HPT) section 37A and a low pressure turbine (LPT) section 37B.

The engine sections 34-37B are arranged (e.g., sequentially) along the axis 28 within a housing 40 of the turbine engine 22. This engine housing 40 includes an inner case structure 42 (e.g., a core case) and an outer case 44 (e.g., a fan case). The inner case structure 42 houses one or more of the engine sections 35A-37B; e.g., a core of the turbine engine 22. The outer case 44 houses at least the fan section 34. A downstream, aft section of the outer case 44 of FIG. 1 is also spaced radially outboard from and axially overlaps an upstream, forward section of the inner case structure 42.

An inner structure 46 of the nacelle 24 (e.g., an inner fixed structure (IFS)) houses and forms an aerodynamic cover over at least a portion of the inner case structure 42. An outer structure 48 of the nacelle 24 houses and forms an aerodynamic cover over the outer case 44. The nacelle outer structure 48 of FIG. 1, for example, includes a forward inlet structure 50, an intermediate structure 52 (e.g., fan cowls) and an aft structure 54. The inlet structure 50 projects axially out from the outer case 44 at the engine forward end 30 to a leading edge 56 of the nacelle outer structure 48 at an upstream, forward end of the aircraft propulsion system 20. This inlet structure 50 of FIG. 1 forms an airflow inlet 58 into the aircraft propulsion system 20. The intermediate structure 52 is spaced radially outboard from and axially overlaps the outer case 44. This intermediate structure 52 of FIG. 1 extends axially between the inlet structure 50 and the aft structure 54. The aft structure 54 projects axially out from the outer case 44 at its aft end to a trailing edge 60 of the nacelle outer structure 48. This aft structure 54 is also spaced radially outboard from and axially overlaps the nacelle inner structure 46. The aft structure 54 of FIG. 1 at least partially forms an exhaust 62 from the aircraft propulsion system 20.

Each of the engine sections 34, 35A, 35B, 37A and 37B includes a bladed rotor 64-68. Each of these engine rotors 64-68 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 64 is connected to a geartrain 70, for example, through a fan shaft 72. The geartrain 70 and the LPC rotor 65 are connected to and driven by the LPT rotor 68 through a low speed shaft 73. The HPC rotor 66 is connected to and driven by the HPT rotor 67 through a high speed shaft 74. The engine shafts 72-74 are rotatably supported by a plurality of bearings 76; e.g., rolling element and/or thrust bearings. Each of these bearings 76 is connected to the engine housing 40 by at least one stationary structure such as, for example, an annular support frame.

During operation, air enters the aircraft propulsion system 20 and its turbine engine 22 through the airflow inlet 58. This air is directed through the fan section 34 and into a core flowpath 78 and a bypass flowpath 80. The core flowpath 78 extends sequentially through the engine sections 35A-37B. The air within the core flowpath 78 may be referred to as "core air". The bypass flowpath 80 extends through a bypass duct radially outboard of and bypassing the engine core. A radial inner peripheral boundary of the bypass flowpath 80 of FIG. 1 is formed by the inner case structure 42 and the nacelle inner structure 46. A radial outer peripheral boundary of the bypass flowpath 80 of FIG. 1 is formed by the outer case 44 and the nacelle outer structure 48. The air within the bypass flowpath 80 may be referred to as "bypass air".

The core air is compressed by the LPC rotor 65 and the HPC rotor 66 and directed into a (e.g., annular) combustion chamber 82 of a (e.g., annular) combustor in the combustor section 36. Fuel is injected into the combustion chamber 82 and mixed with the compressed core air to provide a fuel-air mixture. This fuel-air mixture is ignited and combustion products thereof flow through and sequentially cause the HPT rotor 67 and the LPT rotor 68 to rotate. The rotation of the HPT rotor 67 and the LPT rotor 68 respectively drive rotation of the HPC rotor 66 and the LPC rotor 65 and, thus, compression of the air received from an inlet into the core flowpath 78. The rotation of the LPT rotor 68 also drives rotation of the fan rotor 64. The rotation of the fan rotor 64 propels the bypass air through the bypass flowpath 80 and out of the aircraft propulsion system 20 through the exhaust 62. This propulsion of the bypass air may account for a majority of thrust generated by the turbine engine 22, e.g., more than seventy-five percent (75%) of engine thrust. The turbine engine 22 of the present disclosure, however, is not limited to the foregoing exemplary thrust ratio.

Figure 2:
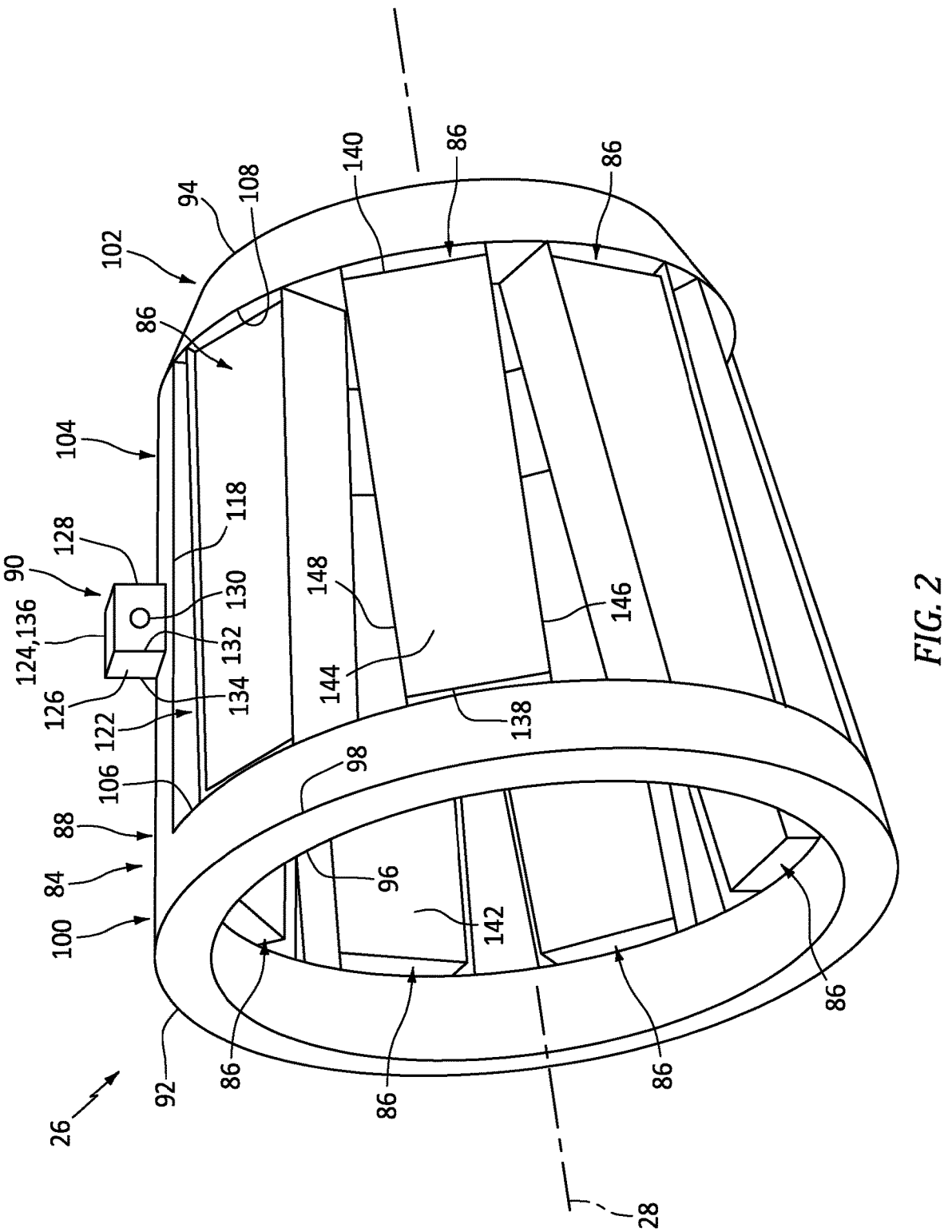
FIG. 2 is a perspective schematic illustration of a heat exchanger for the aircraft propulsion system.

Referring to FIG. 2, the heat exchanger 26 includes a heat exchanger frame 84 ("HX frame") and one or more heat exchanger cores 86 ("HX cores"). The HX frame 84 of FIG. 1 includes a base 88 and a mount 90.

The HX frame 84 and its frame base 88 extend axially along the axis 28 from an axial forward end 92 of the HX frame 84 and its frame base 88 to an axial aft end 94 of the HX frame 84 and its frame base 88. The frame forward end 92 may be an axial forward end of the heat exchanger 26, and the frame aft end 94 may be an axial aft end of the heat exchanger 26. The frame base 88 extends radially from a radial inner side 96 of the HX frame 84 and its frame base 88 to a radial outer side 98 of the frame base 88. The frame inner side 96 may be a radial inner side of the heat exchanger 26. The frame base 88 of FIG. 2 includes an axial forward support ring 100, an axial aft support ring 102 and a backbone 104.

The forward support ring 100 is disposed at (e.g., on, adjacent or proximate) the frame forward end 92. The forward support ring 100 of FIG. 2, for example, extends axially along the axis 28 from an axial aft end 106 of the forward support ring 100 to the frame forward end 92. The aft support ring 102 is disposed at the frame aft end 94. The aft support ring 102 of FIG. 2, for example, extends axially along the axis 28 from an axial forward end 108 of the aft support ring 102 to the frame aft end 94. The forward support ring 100 and the aft support ring 102 each extend radially from the frame inner side 96 to the base outer side 98. The forward support ring 100 and the aft support ring 102 each extend circumferentially about (e.g., completely around) the axis 28, providing each respective support ring 100, 102 with a full-hoop (e.g., annular) geometry, for example.

Figure 3:
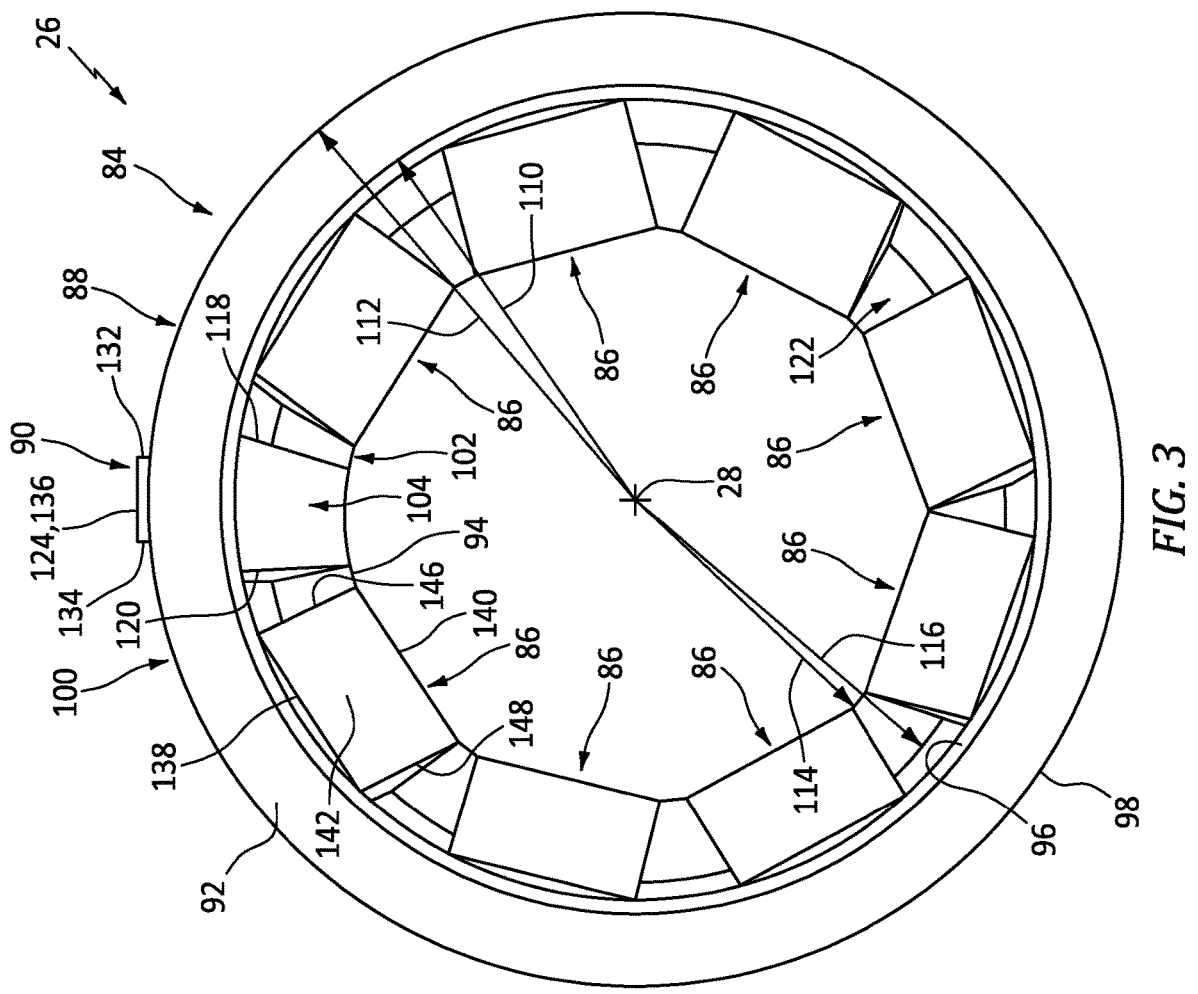
FIG. 3 is an end view schematic illustration of the heat exchanger.

Referring to FIG. 3, the forward support ring 100 has a radial inner radius 110 and a radial outer radius 112. The forward support ring inner radius 110 is measured between the axis 28 and the forward support ring 100 at (or about) an intersection between the frame forward end 92 and the frame inner side 96. The forward support ring outer radius 112 is measured between the axis 28 and the forward support ring 100 at (or about) an intersection between the frame forward end 92 and the base outer side 98. Similarly, the aft support ring 102 has a radial inner radius 114 and a radial outer radius 116. The aft support ring inner radius 114 is measured between the axis 28 and the aft support ring 102 at (or about) an intersection between the frame aft end 94 and the frame inner side 96 (see FIG. 2). The aft support ring outer radius 116 is measured between the axis 28 and the aft support ring 102 at (or about) an intersection between the frame aft end 94 and the base outer side 98 (see FIG. 2). Here, the forward support ring inner radius 110 of FIG. 3 is greater than the aft support ring inner radius 114 and may also be greater than the aft support ring outer radius 116. The forward support ring outer radius 112 of FIG. 3 is greater than the aft support ring outer radius 116 and the aft support ring inner radius 114. However, depending on the specific propulsion system arrangement, it is contemplated the support rings 100 and 102 may alternatively have equal dimensions or the forgoing dimensional relationship between the support rings 100 and 102 may be reversed. Note, while the forward support ring 100 and the aft support ring 102 may be concentric in some embodiments, the forward support ring 100 and the aft support ring 102 may alternatively be offset, angled and/or otherwise non-concentric from one another in other embodiments.

Referring to FIGS. 2 and 3, the backbone 104 is arranged axially between and connected to (e.g., formed integral with or otherwise attached to) the forward support ring 100 and the aft support ring 102. The backbone 104 of FIGS. 2 and 3, for example, extends axially along the axis 28 from the forward support ring 100 to the aft support ring 102. This backbone 104 also extends radially inwards (towards the axis 28) from the forward support ring 100 to the aft support ring 102. The backbone 104 of FIGS. 2 and 3 extends radially from the frame inner side 96 to the base outer side 98. The backbone 104 of FIG. 3 extends laterally (e.g., circumferentially or tangentially) between opposing lateral sides 118 and 120 of the backbone 104. With this arrangement, the forward support ring 100, the aft support ring 102 and the backbone 104 form an aperture 122 (e.g., a through-hole, a window, etc.) in the HX frame 84 and its frame base 88.

The frame aperture 122 of FIG. 3 extends radially through the HX frame 84 and its frame base 88 from the frame inner side 96 to the base outer side 98. The frame aperture 122 extends axially along the axis 28 within the HX frame 84 and its frame base 88 from the forward support ring 100 at its aft end 106 to the aft support ring 102 at its forward end 108; see also FIG. 2. The frame aperture 122 extends circumferentially within the HX frame 84 and its frame base 88 from the backbone first lateral side 118 to the backbone second lateral side 120. Here, the frame aperture 122 extends N number of degrees circumferentially about (e.g., partially around) the axis 28 between the opposing backbone lateral sides 118 and 120. This N number of degrees may be equal to or greater than three hundred and twenty degrees (320°); e.g., between three hundred and thirty degrees (330°) and three hundred and forty degrees (340°), between three hundred and forty degrees (340°) and three hundred and fifty degrees (350°), or greater than three hundred and fifty degrees (350°).

Referring to FIG. 2, the frame mount 90 may be configured as a mounting flange. The frame mount 90 of FIG. 3, for example, is connected to (e.g., formed integral with or otherwise attached to) the frame base 88 and its backbone 104. This frame mount 90 projects radially out from the frame base 88 and its backbone 104 at the base outer side 98 to a radial outer distal end 124 of the frame mount 90. The frame mount 90 extends axially along the axis 28 and the backbone 104 from an axial forward end 126 of the frame mount 90 to an axial aft end 128 of the frame mount 90. The mount forward end 126 of FIG. 2 is axially spaced from the frame forward end 92 by an axial distance. The mount aft end 128 of FIG. 2 is axially spaced form the frame aft end 94 by an axial distance. These axial distances may be selected such that a mounting aperture 130 in the frame mount 90 is axially aligned with an axial center of gravity of the heat exchanger 26. The frame mount 90 extends laterally between opposing lateral sides 132 and 134 of the frame mount 90, where each mount lateral side 132, 134 is respectively laterally spaced (e.g., recessed) from a respective one of the backbone lateral sides 118 and 120; see also FIG. 3.

The frame mount 90 of FIG. 2 is configured with its (e.g., single) mounting aperture 130. This mounting aperture 130 extends laterally through the frame mount 90 between the opposing mount lateral sides 132 and 134. Here, the frame mount 90 and the backbone 104 are arranged at a vertical top 136 (e.g., relative to a direction of gravity when the aircraft is on ground and/or in level flight) of the heat exchanger 26.

The HX frame 84 may be configured as a monolithic body. The HX frame 84 and its various members 90, 100, 102 and 104, for example, may be cast, machined, additively manufactured and/or otherwise formed as a single, unitary body. The present disclosure, however, is not limited to such an exemplary monolithic constructure. The HX frame 84, for example, may alternatively be configured into a plurality of segments (e.g., circumferential halves) which are discretely formed and subsequently permanently or temporarily attached together. The HX frame 84 and its various members 90, 100, 102 and 104 may be constructed from metal or a composite material capable of withstanding required heat loads of the heat exchanger 26.

Figure 4:
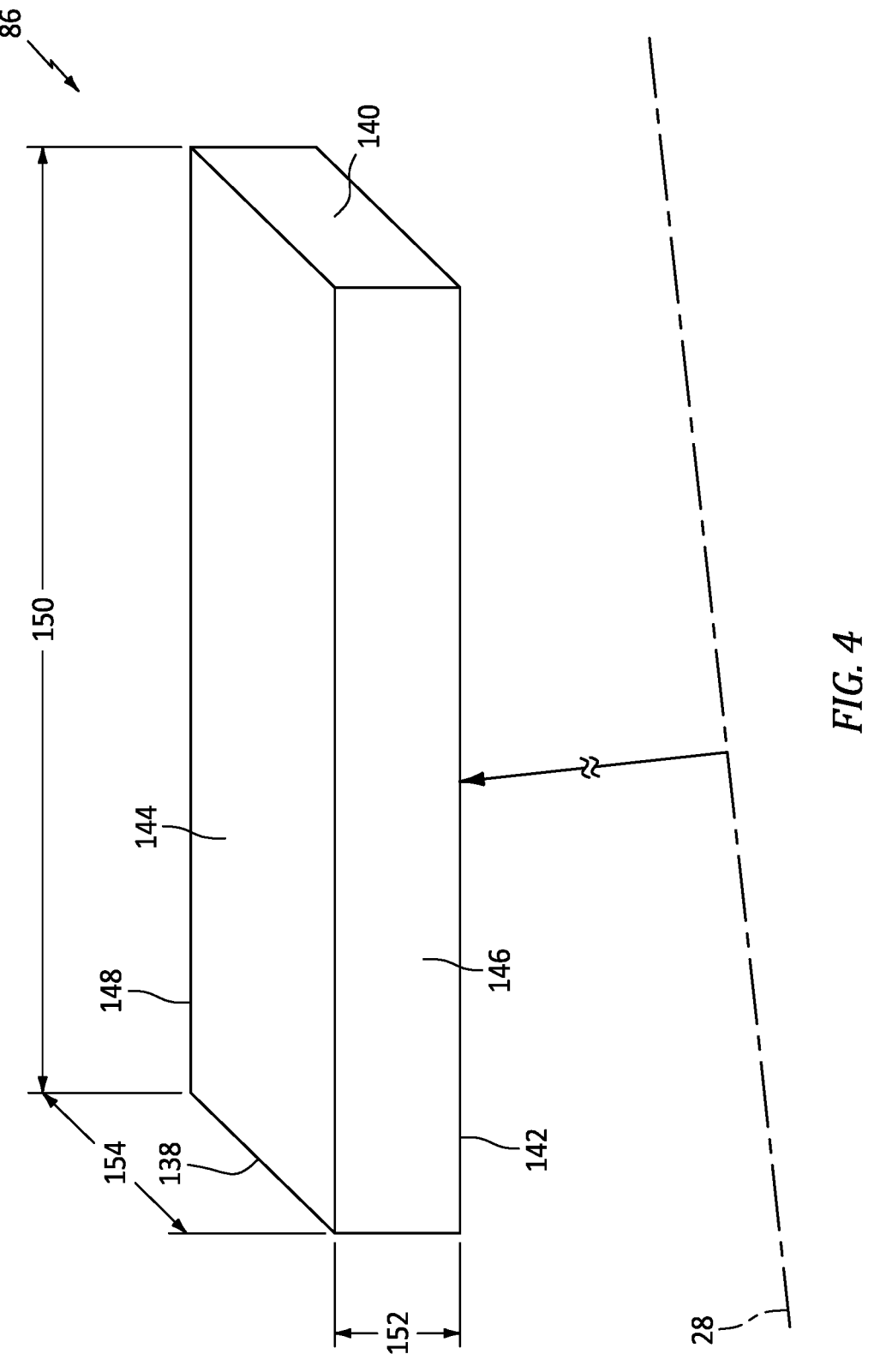
FIG. 4 is a perspective schematic illustration of a heat exchanger core for the heat exchanger.

Referring to FIG. 4, each HX core 86 extends axially along the axis 28 from an axial forward end 138 of the respective HX core 86 to an axial aft end 140 of the respective HX core 86. Each HX core 86 extends radially from a radial inner side 142 of the respective HX core 86 to a radial outer side 144 of the respective HX core 86. Each HX core 86 extends laterally between and to opposing lateral sides 146 and 148 of the respective HX core 86.

Each HX core 86 has an axial length 150, a radial height 152 and a lateral thickness 154. The core length 150 is measured between the core forward end 138 and the core aft end 140. This core length 150 may be uniform (e.g., constant) as the respective HX core 86 extends radially and/or laterally. The core height 152 is measured between the core inner side 142 and the core outer side 144. This core height 152 may be uniform as the respective HX core 86 extends axially and/or laterally. Alternatively, the core height 152 may vary (e.g., taper) as the respective HX core 86 extends axially and/or laterally. The core thickness 154 is measured between the opposing core lateral sides 146 and 148. This core thickness 154 may be uniform as the respective HX core 86 extends axially and/or radially. Alternatively, the core thickness 154 may vary (e.g., taper) as the respective HX core 86 extends axially and/or radially. Moreover, while the HX cores 86 in FIGS. 2 and 3 are shown with common configurations (e.g., geometries, dimensions, etc.), it is contemplated one or multiple of the HX cores 86 may have a different configuration than one or more others of the HX cores 86.

Figure 5:
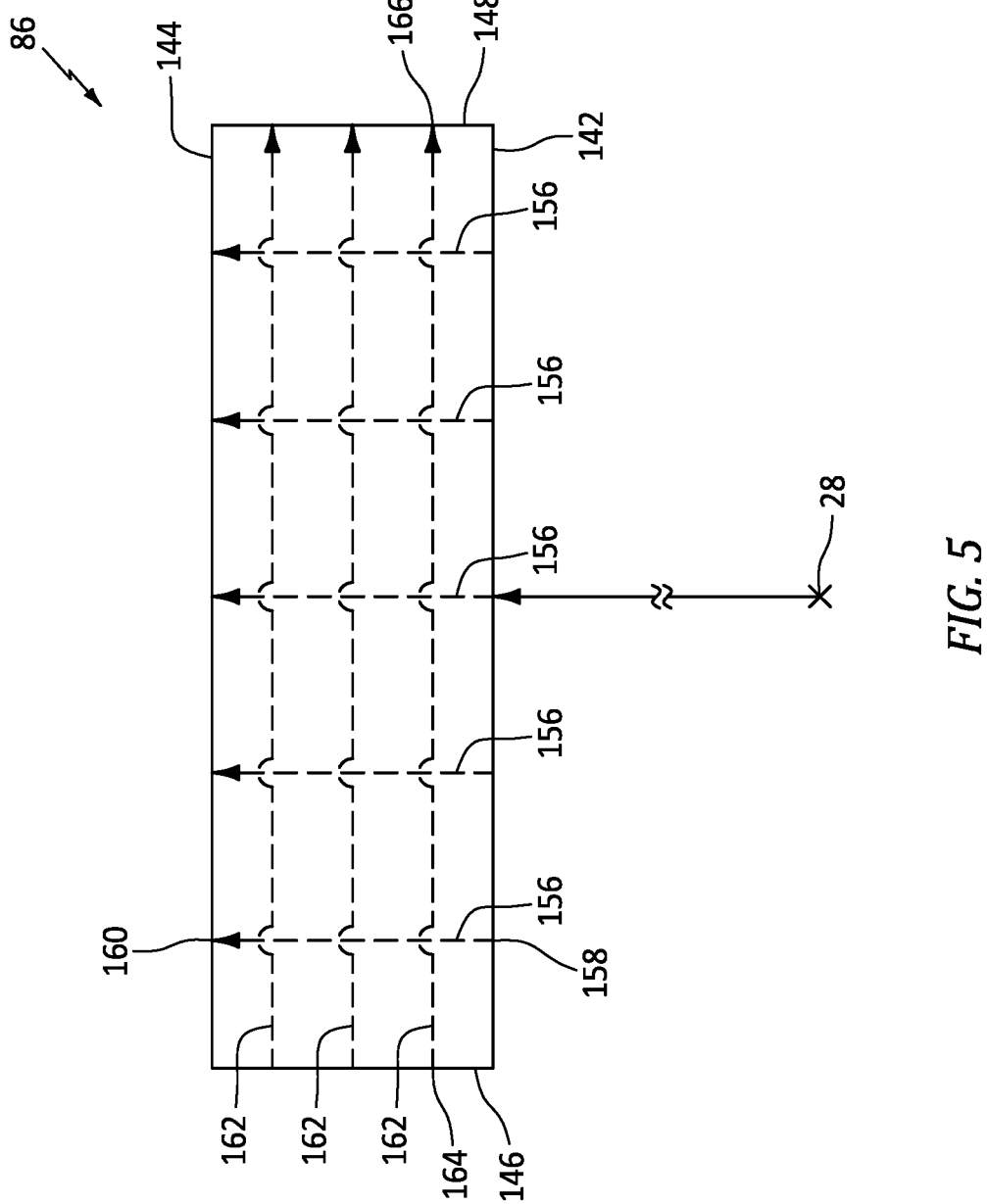
FIG. 5 is a schematic end view illustration of the heat exchanger core with their internal passages.

Referring to FIG. 5, each HX core 86 may include one or more radial passages 156. Each of these radial passages 156 extends radially across (e.g., through) the respective HX core 86 from an inlet 158 into the respective radial passage 156 at the core inner side 142 to an outlet 160 from the respective radial passage 156 at the core outer side 144. However, the radial passage inlet 158 and the radial passage outlet 160 may alternatively be respectively disposed at the core outer side 144 and the core inner side 142 in other embodiments.

Figure 6:
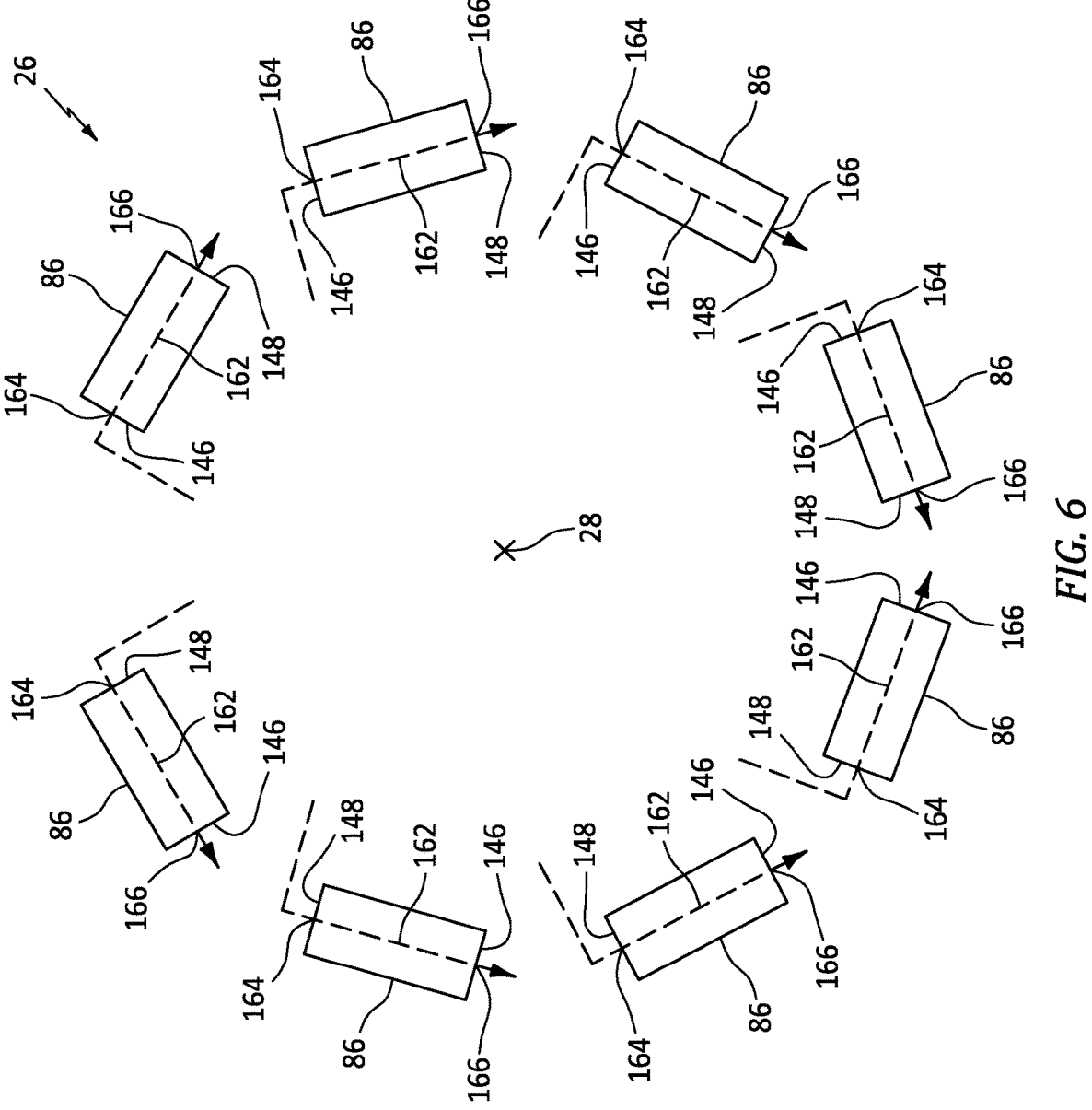
FIG. 6 is an end view schematic illustration of the heat exchanger cores with its lateral internal passages.

Each HX core 86 may include one or more lateral passages 162. Each of these lateral passages 162 extends laterally across (e.g., through) the respective HX core 86 from an inlet 164 into the respective lateral passage 162 at the core first lateral side 146 to an outlet 166 from the respective lateral passage 162 at the core second lateral side 148. However, the lateral passage inlet 164 and the lateral passage outlet 166 may alternatively be respectively disposed at the core second lateral side 148 and the core first lateral side 146 in other embodiments. For example, referring to FIG. 6, the lateral passage inlet 164 and the lateral passage outlet 166 may be arranged such that the lateral passage outlet 166 is vertically below the lateral passage inlet 164 for each HX core 86. Liquid (e.g., condensation) within each lateral passage 162 may thereby readily drain out of the respective HX core 86. The present disclosure, however, is not limited to such an exemplary lateral passage arrangement.

Each HX core 86 of FIG. 5 may be configured as a cross-flow heat exchanger unit. Each lateral passage 162 of FIG. 5, for example, is angularly offset from one or more of the radial passages 156 by an included offset angle. This offset angle may be a ninety degree (90°), right angle. Alternatively, the offset angle may be an acute or obtuse angle; e.g., within ten or twenty degrees (10-20°) of the right angle. The present disclosure, however, is not limited to such an exemplary cross-flow arrangement. One or more or all of the HX cores 86, for example, may alternatively be configured as a counterflow heat exchange unit or a parallel flow heat exchange unit or some combination of a cross-flow, a counterflow and/or a parallel flow heat exchange unit.

Referring to FIGS. 2 and 3, the HX cores 86 are arranged circumferentially about the axis 28 in an array; e.g., an arcuate array, a substantially annular array, etc. This array of HX cores 86 is disposed in the frame aperture 122 and supported by the HX frame 84. The array of HX cores 86 of FIGS. 2 and 3, for example, is arranged within the frame aperture 122 axially between the forward support ring 100 and the aft support ring 102. The array of HX cores 86 is arranged within the frame aperture 122 circumferentially between the opposing backbone lateral sides 118 and 120. The array of HX cores 86 may also be arranged within the frame aperture 122 radially between (or about) the frame inner side 96 and the base outer side 98. The core inner sides 142, for example, may be radially aligned with (or positioned slightly radially inward or outward from) the frame inner side 96. The core outer sides 144 may be radially aligned with (or positioned slightly radially outward or inward from) the base outer side 98. In FIG. 2, the HX cores 86 and gaps between the HX core 86 are axially aligned along the axis 28. It is contemplated, however, some or all of the HX cores 86 and/or the gaps therebetween may alternatively be (e.g., slightly or completely) axially offset from one another along the axis 28 to promote a spiral flow trajectory through in/through the heat exchanger 26.

Figure 7:
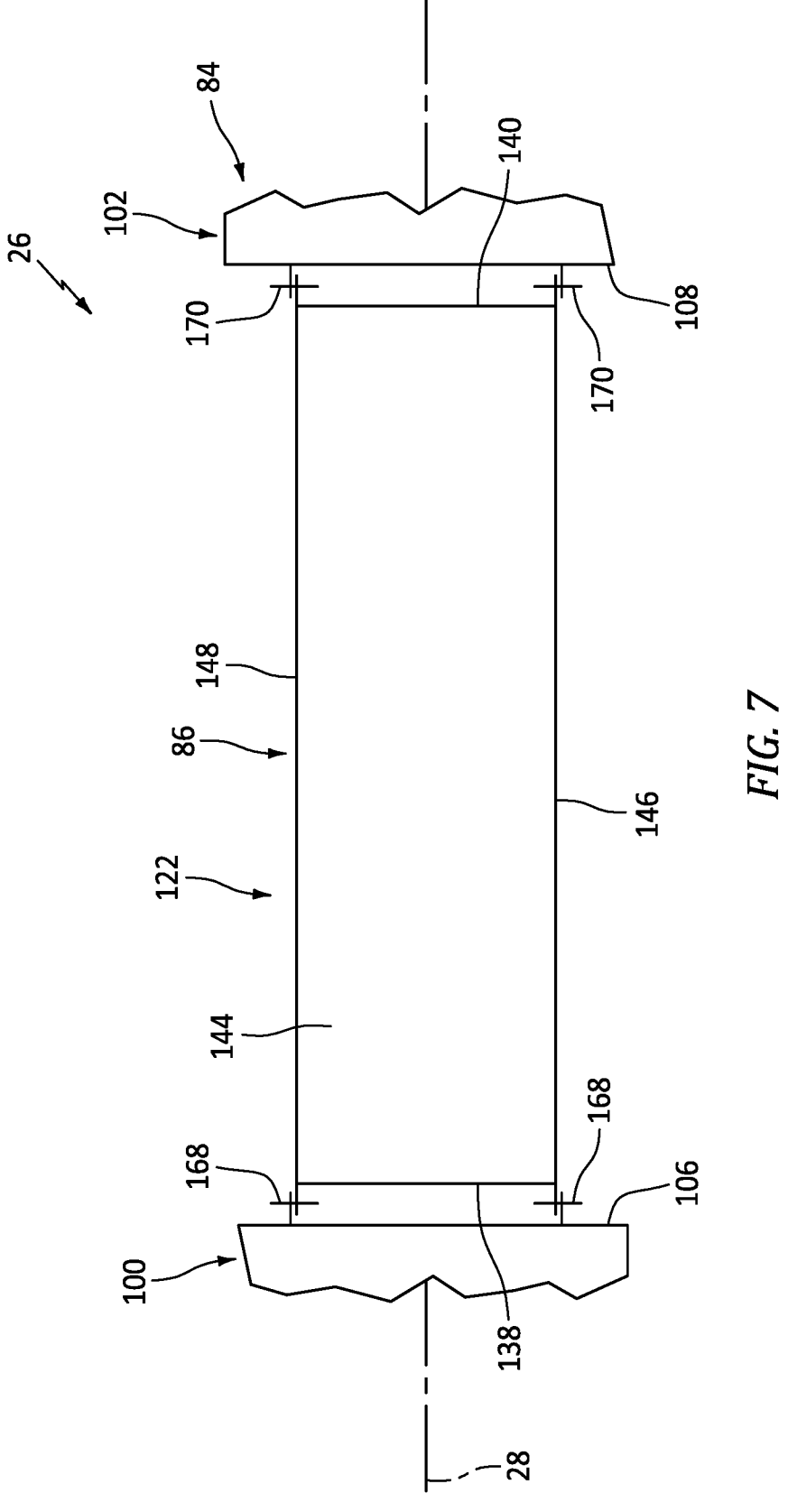
FIG. 7 is a top side view illustration of a heat exchanger core mounted to a heat exchanger frame.

The HX cores 86 are mounted to the HX frame 84. Each HX core 86 of FIG. 7, for example, is mechanically fastened (e.g., bolted, pinned, etc.) to the forward support ring 100 and the aft support ring 102. Each HX core 86 of FIG. 7, in particular, is attached to the forward support ring 100 by one or more mechanical fasteners 168; e.g., bolts, pins, etc. Each HX core 86 of FIG. 7 is attached to the aft support ring 102 by one or more mechanical fasteners 170; e.g., bolts, pins, etc. Each HX core 86 may thereby be fixedly attached to the HX frame 84 and its members 100 and/or 102.

Referring to FIG. 1, the heat exchanger 26 and its members 84 and 86 are housed by the nacelle 24 and its nacelle outer structure 48. The heat exchanger 26 and its members 84 and 86, for example, may be disposed within a cavity 172 (e.g., an annular cavity) within the nacelle outer structure 48. This nacelle cavity 172 may be formed by and extends radially between (a) the outer case 44 and (b) an outer wall 174 of the nacelle 24 and its nacelle outer structure 48. The nacelle cavity 172 may also be formed by and extend radially between (a) an inner wall 176 of the nacelle 24 and its nacelle aft structure 54 and (b) the nacelle outer wall 174. With this arrangement, the heat exchanger 26 and its members 84 and 86 of FIG. 1 are disposed radially outboard of, extend axially along (e.g., axially overlap) and extend circumferentially about (e.g., circumscribe) the outer case 44 and/or the bypass flowpath 80, as well as the engine core.

Each of the radial passages 156 may be fluidly coupled with and downstream of the bypass flowpath 80. Each radial passage 156 of FIG. 1, for example, may receive bypass air bleed from or otherwise split off from the bypass flowpath 80. Each of the lateral passages 162 may be fluidly coupled with and downstream of (or fluidly coupled inline with) the core flowpath 78. Each lateral passage 162 of FIG. 1, for example, may receive the combustion products output from the turbine engine 22. With this arrangement, the heat exchanger 26 and each of its HX cores 86 is configured as a gas-to-gas heat exchanger; e.g., a gas-to-gas condenser. The present disclosure, however, is not limited to such an exemplary arrangement. A liquid working fluid such as a thermal bus working fluid or the like, for example, may alternatively be routed through the heat exchanger 26 rather than the combustion products.

The turbine engine 22 and the heat exchanger 26 may each be independently mounted to an airframe structure 178 of the aircraft. For ease of description, the airframe structure 178 is generally described as a pylon that extends between and structurally ties the aircraft propulsion system 20 to a wing or a fuselage of the aircraft. The airframe structure 178, however, may alternatively be configured as another component of the aircraft's airframe.

The turbine engine 22 is mounted to the airframe structure 178 by an engine mounting structure. The engine mounting structure of FIG. 1 includes at least one outer case mount 180, one or more thrust links 182 and one or more inner case mounts 184. The outer case mount 180 is attached to and extends radially between the outer case 44 and the airframe structure 178. This outer case mount 180 structurally ties and is configured to transfer substantially radial loads (e.g., non-axial loads) between the turbine engine 22 and the airframe structure 178. The thrust links 182 are attached to and extend radially between the inner case structure 42 and the airframe structure 178. These thrust links 182 structurally tie and are configured to transfer substantially thrust loads (e.g., axial loads) between the turbine engine 22 and the airframe structure 178. The inner case mounts 184 are attached to and extend radially between the inner case structure 42 and the airframe structure 178. These inner case mounts 184 structurally tie and are configured to transfer substantially radial loads (e.g., non-axial loads) between the turbine engine 22 and the airframe structure 178. The mounting structure may thereby fixedly connect the turbine engine 22 to the airframe structure 178.

While the mounting structure and its members 182 and 184 extend radially across the heat exchanger 26, the mounting structure and all of its members 180, 182 and 184 may be structurally decoupled from the heat exchanger 26. For example, each mounting structure member 182, 184 may extend through the frame aperture 122 between a circumferentially neighboring (e.g., adjacent) pair of the HX cores 86 and/or axially between a respective HX core 86 and a member of the HX frame 84. Of course, various other mounting structure arrangements are known in the art for mounting a turbine engine to a pylon, and the present disclosure is not limited to any particular ones thereof.

The heat exchanger 26 is mounted to the airframe structure 178 by a pivot mount 186; e.g., a pin, a fastener such as a bolt, etc. This pivot mount 186 of FIG. 1 projects from the backbone 104 and is attached to the airframe structure 178. With this arrangement, the heat exchanger 26 and its HX frame 84 is movably connected (e.g., pivotally attached) to the airframe structure 178. The heat exchanger 26 may thereby move (e.g., slightly) pivot relative to the airframe structure 178 as well as the turbine engine 22 during aircraft operation. Of course, an additional radially compliant mount 188 may be included to limit and/or damp movement between the heat exchanger 26 and the airframe structure 178 and/or the turbine engine 22. Here, the pivot mount 186 structurally ties and is configured to transfer loads between the heat exchanger 26 and the airframe structure 178, independent of the turbine engine 22 and its mounting structure. With this arrangement, inclusion of the heat exchanger 26 may not affect structural dynamics of the turbine engine 22 and/or its mounting structure. Loads associated with operation of the turbine engine 22 may be transferred into the airframe structure 178 without imparting those loads onto a structure of the heat exchanger 26. In addition, the independent mounting of the heat exchanger 26 may facilitate thermally induced shifting between the turbine engine 22 and the heat exchanger 26 during propulsion system operation.

In some embodiments, the heat exchanger 26 may be configured as a cooler. In other embodiments, the heat exchanger 26 may be configured as a heater. In other embodiments, the heat exchanger 26 may be configured as a condenser. In still other embodiments, the heat exchanger 26 may be configured as an evaporator. The present disclosure, however, is not limited to the foregoing exemplary heat exchanger configurations.

The heat exchanger 26 described above may be configured with various turbine engines other than the one described above. The heat exchanger 26, for example, may be configured with a geared turbine engine where a geartrain connects one or more shafts to one or more rotors in a fan section, a compressor section and/or any other engine section. Alternatively, the heat exchanger 26 may be configured with a turbine engine configured without a geartrain; e.g., a direct drive turbine engine. The turbine engine may be configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. Moreover, the core of the turbine engine may be configured as a forward flow engine core (e.g., see FIG. 1) or a reverse flow engine core. The present disclosure therefore is not limited to any particular types or configurations of turbine engines. Moreover, the heat exchanger 26 may be utilized with other types of engines other than turbine engines; e.g., a rotary engine, a reciprocating piston engine, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
an airframe structure;
a turbine engine mounted to the airframe structure; and
a heat exchanger mounted to the airframe structure independent of the turbine engine, the heat exchanger extending axially along and circumferentially about the turbine engine;
wherein the turbine engine is fixedly mounted to the airframe structure; and
wherein the heat exchanger is movably mounted to the airframe structure.

2. The assembly of claim 1, wherein the airframe structure comprises a pylon;

the turbine engine is mounted to the pylon; and the heat exchanger is mounted to the pylon independent of the turbine engine.

3. The assembly of claim 1, further comprising:

a mounting structure structurally tying the turbine engine to the airframe structure;

the mounting structure extending radially across and structurally decoupled from the heat exchanger.

4. The assembly of claim 1, wherein the heat exchanger is pivotally mounted to the airframe structure by a pivot connection.

5. The assembly of claim 1, further comprising:

a bypass flowpath arranged downstream of a fan section of the turbine engine, the bypass flowpath disposed radially outboard of a core of the turbine engine;

the heat exchanger disposed radially outboard of and axially overlapping the bypass flowpath.

6. The assembly of claim 1, wherein the heat exchanger includes a frame mounted to the airframe structure; and a plurality of heat exchanger cores arranged circumferentially about an axis, each of the plurality of heat exchanger cores attached to and supported by the frame.

7. The assembly of claim 6, wherein the plurality of heat exchanger cores comprises a first heat exchanger core;

a first passage extends radially across the first heat exchanger core; and a second passage extends laterally across the first heat exchanger core.

8. The assembly of claim 7, wherein the turbine engine is configured to direct air into the first passage and combustion products into the second passage.

9. The assembly of claim 1, wherein the heat exchanger comprises a condenser.

10. An assembly for an aircraft, comprising:

an airframe structure;

a turbine engine mounted to the airframe structure; and a heat exchanger mounted to the airframe structure independent of the turbine engine, the heat exchanger extending axially along and circumferentially about the turbine engine; and a nacelle housing the turbine engine;

the heat exchanger disposed in a cavity radially between a case of the turbine engine and a wall of the nacelle.

11. An assembly for an aircraft, comprising:

an airframe structure;

a turbine engine mounted to the airframe structure; and a heat exchanger mounted to the airframe structure independent of the turbine engine, the heat exchanger extending axially along and circumferentially about the turbine engine, wherein the heat exchanger includes a frame mounted to the airframe structure; and a plurality of heat exchanger cores arranged circumferentially about an axis, each of the plurality of heat exchanger cores attached to and supported by the frame, wherein the frame includes a first support ring, a second support ring and a backbone;

wherein the first support ring and the second support ring each extend circumferentially around the turbine engine;

wherein the backbone extends axially between and is connected to the first support ring and the second ring; and wherein the plurality of heat exchanger cores are arranged axially between and mounted to the first support ring and the second support ring.

12. The assembly of claim 11, wherein the first support ring and the second support ring are connected to the airframe structure through the backbone.

13. The assembly of claim 11, wherein an aperture extends radially through the frame, the aperture extends axially within the frame between the first support ring and the second support ring, and the aperture extends circumferentially about an axis within the frame between opposing sides of the backbone; and the plurality of heat exchanger cores are arranged in the aperture.

14. The assembly of claim 11, wherein the plurality of heat exchanger cores comprises a first heat exchanger core;

the first heat exchanger core extends axially between a first end and a second end;

the first heat exchanger core is mechanically fastened to the first support ring at the first end; and the first heat exchanger core is mechanically fastened to the second support ring at the second end.

15. The assembly of claim 11, wherein the turbine engine comprises a turbofan engine with a fan case;

the first support ring is radially outboard of and axially overlaps the fan case; and the second support ring is spaced axially from the fan case.

16. An assembly for an aircraft, comprising:

a frame including a first support ring, a second support ring, a backbone and an aperture, the first support ring and the second support ring each extending circumferentially around an axis, the backbone extending axially between and connected to the first support ring and the second ring, the aperture extending radially through the frame, the aperture extending axially within the frame between the first support ring and the second support ring, and the aperture extending circumferentially about the axis within the frame between opposing sides of the backbone; and a plurality of heat exchanger cores arranged circumferentially about the axis in an array, the array of the plurality of heat exchanger cores arranged in the aperture axially between the first support ring and the second support ring, and each of the plurality of heat exchanger cores mounted to the first support ring and the second support ring.

17. The assembly of claim 16, further comprising:

an airframe structure;

the backbone pivotally mounted to the airframe structure by a pivot connection.

18. The assembly of claim 16, further comprising:

a turbofan engine;

the frame and the array of the plurality of heat exchanger cores axially overlapping and extending circumferentially about the turbofan engine.

* * * * *